United States Patent [19]

Hampton et al.

[11] Patent Number: 4,840,069

[45] Date of Patent: Jun. 20, 1989

[54] ELECTRO-OPTIC SPACE POSITIONER WITH BACKGROUND COMPENSATOR

[75] Inventors: Herbert R. Hampton, Hauppauge; Robert Fodale, Massapequa; Charles R. Conkling, Jr., Shoreham, all of N.Y.

[73] Assignee: Grumman Aerospace Corporation, Bethpage, N.Y.

[21] Appl. No.: 183,421

[22] Filed: Apr. 18, 1988

Related U.S. Application Data

[63] Continuation of Ser. No. 903,366, Sep. 3, 1986, abandoned.

[51] Int. Cl.$^4$ .............................................. G01M 5/00
[52] U.S. Cl. ...................................... 73/802; 356/141; 250/214 B
[58] Field of Search ................. 73/800, 802, 655; 356/222, 226, 229, 230, 231, 232, 434, 141; 364/525, 571; 250/214 B, 214 C, 345

[56] References Cited

U.S. PATENT DOCUMENTS

| | | | |
|---|---|---|---|
| 3,721,963 | 3/1973 | Jenne | 365/64 |
| 3,770,967 | 11/1973 | Hanna et al. | 250/214 R |
| 3,806,929 | 4/1974 | Moore | 342/90 |
| 3,904,818 | 9/1975 | Kovac | 358/160 |
| 3,972,626 | 8/1976 | Laskowsi | 356/226 |
| 3,975,624 | 8/1976 | Kay | 364/786 |
| 3,979,589 | 9/1976 | Sternberg et al. | 250/345 |
| 4,061,925 | 12/1977 | van der Gaag et al. | 250/553 |
| 4,097,731 | 6/1978 | Krause et al. | 250/205 |
| 4,097,732 | 6/1978 | Krause et al. | 250/205 |
| 4,099,248 | 7/1978 | Borgerson et al. | 364/787 |
| 4,128,760 | 12/1978 | Del Signore, II | 250/214 B |
| 4,136,568 | 1/1979 | Seymour | 73/655 |
| 4,201,472 | 5/1980 | Maeda | 356/226 |
| 4,243,879 | 1/1981 | Carroll et al. | 250/214 B |
| 4,288,154 | 9/1981 | Sakurada et al. | 354/471 |
| 4,291,979 | 9/1981 | Yuasa et al. | 356/218 |
| 4,341,956 | 7/1982 | Bax | 250/214 C |
| 4,345,148 | 8/1982 | Pines et al. | 250/214 C |
| 4,419,012 | 12/1983 | Stephenson et al. | 250/214 B |

OTHER PUBLICATIONS

IBM Technical Disclosure Bulletin, vol. 20, No. 5, Oct. 1977, pp. 1935-1936.

*Primary Examiner*—Stewart J. Levy
*Assistant Examiner*—Robert R. Raevis
*Attorney, Agent, or Firm*—Pollock, VandeSande & Priddy

[57] ABSTRACT

The output of a diode array undergoes A/D conversion. A constant digital value is added to the output when remote light sources remain de-energized to establish an ambient threshold level. The remote sources are then energized; and when a digital array output signal is sensed at a level exceeding the threshold, the positive existence of a sensed source is established. The invention has application in the measurement of aircraft wing vibration.

2 Claims, 4 Drawing Sheets

COMMON (+)   VIDEO (−)

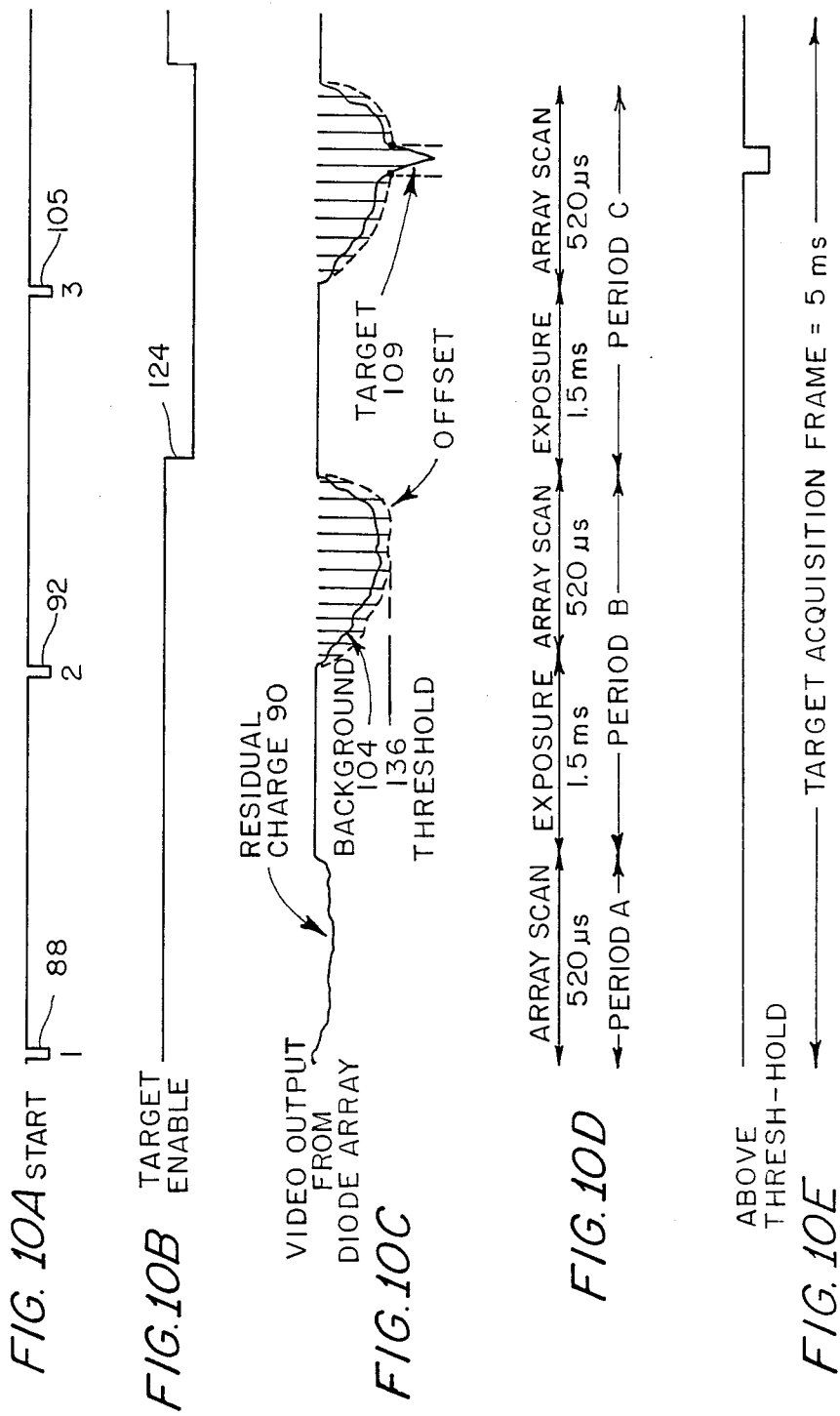

ELECTRO-OPTIC SPACE POSITIONER WITH BACKGROUND COMPENSATOR

This application is a continuation of prior application Ser. No. 903,366, filed Sept. 3, 1986, which was abandoned in favor of this application now abandoned.

FIELD OF THE INVENTION

The present invention relates to an adaptive electro-optic filter utilized to measure position changes of an object in space.

BRIEF DESCRIPTION OF THE PRIOR ART

There is a continuing need in many fields for apparatus which will provide accurate measurement of the position of a point in space with respect to a reference. Such a system should possess high resolution capability to determine point coordinates, high frequency response to determine transient phenomena and the ability to generate signal data outputs in real time.

Intended applications are many and varied, all with the need for a precise measurement of spatial point position. Examples are flutter and buffet analysis of aircraft, structural load determination, flight test instrumentation, recovery and docking aids, landing aids, surveying, collision avoidance systems, flexure evaluation of bridges, navigation instruments and so on.

Consider the example of the measurement of aircraft wing deflections while in flight and the classic available methods therefor. The use of strain gages is limited by wing materials and structural designs, which despite large wing deflections may yield low, non-repeatable strain levels. Accelerometers are not suitable for steady state or low frequency wing deflections. Cinematographic techniques are inadequate from a resolution and accuracy standpoint and are often employed as qualitative tools only.

U.S. Pat. No. 4,136,568 to Herbert Seymour, issued Jan. 30, 1979, and assigned to the present assignee is designed to fill this technical void. The system employing the electro-optic sensor yields real time quantitative data with an accuracy equal to or better than that obtained by either strain gage or accelerometer systems while retaining the reliability and design versatility inherent with cinematographic/videographic target tracking systems.

The electro-optic sensor or head of the patent includes a cylindrical lens which stigmatizes the light rays from a remote light source to a line at the focal plane of the lens instead of focusing the light rays to a point as would occur with a circular lens. The line image is stigmatized at a photoelectric pick-off device whose output corresponds to the position of the line image. A typical pick-off device is a light sensitive diode array which is scanned electronically to locate the position of the line image. The position of the line image is indicative of the direction to the light source measured from the neutral plane of the lens. Because of the cylindrical lens, the electro-optic sensor is insensitive to lateral position displacement and is sensitive only to displacement normal to the neutral plane.

In applying the electro-optic head to the problem outlined above, a plurality of light emitting diodes are strategically located over the entire undersurface of the aircraft wing. The diodes are sequentially energized by a control circuit and the light flux from each emitter is received at an electro-optic sensor attached to the fuselage of the aircraft. The photoelectric pick-off of the sensor transmits positional information to a control unit which manipulates the information to yield exact data on the movement of each light source.

Each emitter is energized for about five milliseconds. During the "on" time the electro-optic head interrogates the emitter image for a number of scans, as set within the control unit. The control unit deciphers each scan, averages the results of all scans, outputs the results of all scans, outputs the resulting positional data with the emitter identification (ID) and then proceeds to the next emitter and repeats the process.

The scan rate of the system employed will dictate the rate of acceptable applications to measurement of vibrating structures.

For example, for quasi-steady state data acquisition, scan averaging can be effectively used to minimize the effect of high frequency oscillations.

This positional information from remote structures (hereinafter referred to as targets) can be used to determine first or second derivatives with respect to time for tracking purposes or vibration studies, if desired. One-dimensional applications are exemplified by deflection measurements for load studies; two-dimensional applications might be in alignment or range measurements; three-dimensional uses would involve relatively moving vehicles in space, as in space rendezvous, refueling operations and so on.

SUMMARY OF THE INVENTION

The present invention is an improvement in the technology of the previously mentioned patent. Although a device built in accordance with that patent operates satisfactorily, the effective measurement range is limited because the prior system utilizes an analog comparator for measuring detected light signals above a preselected threshold without specific regard for the contribution of background light (noise). Hence, the present invention employs signal processing which first quantizes background light and digitally subtracts it from composite signals including background and target information components. Therefore, a digital threshold level of greater tolerance can be established which results in a greater increase in effective measurement range of the present invention.

When the present invention is adapted to measure target displacement, namely aircraft wing displacement during flight conditions, the testing range between the aircraft and a testing receiver can be greatly increased when compared with the prior art. Further advantages in this flight testing application include:

the invention virtually eliminates flight test data loss due to ambient light interference. The high cost of repeated data flights is eradicated;

extending the effective measurement range of the system allows use of lower power targets. Lower power targets are not only less costly but have longer service life increasing the system reliability and reducing maintenance costs;

the enhanced utility of the present system and its derivatives increases its value to the customer and is more attractive to a broader range of uses and users;

the invention can be easily retrofit to previously installed prior art systems; and the inventive concept has other applications for enhancing data retrieval from any photodiode array.

The above-mentioned objects and advantages of the present invention will be more clearly understood when considered in conjunction with the accompanying drawings, in which:

BRIEF DESCRIPTION OF THE FIGURES

FIG. 10A is a timing diagram of start commands as utilized in the digital circuitry of FIG. 9;

FIG. 10B is a timing diagram of the target enable signal as utilized in the digital circuitry of FIG. 9;

FIG. 10C is a timing diagram of the video output from a diode array as utilized in the digital circuitry of FIG. 9;

FIG. 10D is a timing diagram of array and exposure timing intervals during a cycle of operation of the digital circuitry of FIG. 9;

FIG. 10E is a timing diagram of a threshold signal during a target acquisition frame of the digital circuitry of FIG. 9.

DETAILED DESCRIPTION OF THE INVENTION

Figure 1:
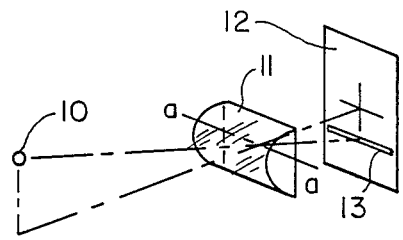
FIG. 1 is a pictorial illustration of a cylindrical lens.
Figure 2:
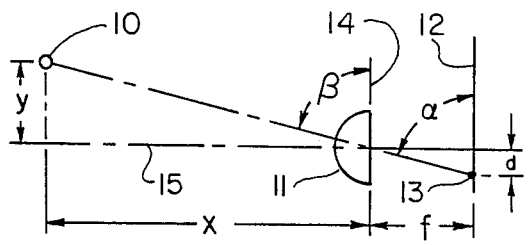
FIG. 2 defines geometric relationships involved in FIG. 1.

In order to appreciate the improvement of the present invention, the initial discussion will pertain to the most relevant prior art electro-optic system of U.S. Pat. No. 4,136,568. With reference to this prior art, FIG. 1 shows a light source 10 stigmatized by a cylindrical lens 11 at the focal plane 12 of the lens 11 as a line 13. The line 13 is parallel to the longitudinal axis of lens 11. As seen in FIG. 2 when the light source 10 is located in a plane parallel to plane 14 of lens 11 at a distance x therefrom and displaced from the neutral plane 15 of lens 11 by an amount y, the image 13 falls on the focal plane 12, which is a distance f behind plane 14, at a distance d below the neutral plane 15. The controlling equations are: $angle\ alpha = arc\ tan\ f/d$, and the $angle\ beta = arc\ tan\ x/y = F(alpha)$. The latter is a function of alpha, where f and F(alpha) have been determined from laboratory lens calibration. When F(alpha) is equal to alpha then beta=alpha and $y/x=d/f$. That relationship is substantially true and will be assumed to exist for ease of description.

Figure 3:
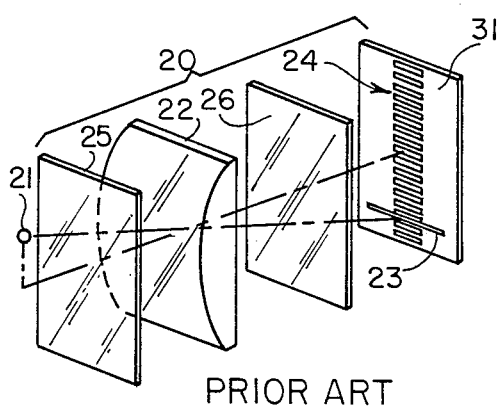
FIG. 3 illustrates an arrangement of optical and electrical components.

FIG. 3 shows the optical components and position sensor of an electro-optic head 20 using the principle of FIG. 2. The electro-optic head is used in conjunction with a light source 21. Preferably the light source 21 is a light emitting diode operating in the infrared range, so as to permit filtering out of unwanted light energy from other sources. The cylindrical lens 22 stigmatizes the I.R. energy from emitter 21 into a line of light 23 on the light sensitive diode array 24. When the emitter 21 moves vertically, the line 23 moves proportionally in the opposite direction, up or down the array 24. Lateral displacement, parallel to the lens, does not affect the vertical position of the line 23.

An infrared pass filter 25 placed in front of lens 22 has a low end cutoff of about 0.78 micrometer thus eliminating visible light from the head 20. A second filter 26 in front of the diode array 24 has a center wavelength equal to the ambient wavelength of the emitter 21. This filter 26 rejects all wavelengths except those of the emitter 21 in the near I.R. region, i.e. those to which the diode array 24 is most sensitive.

Figure 4:
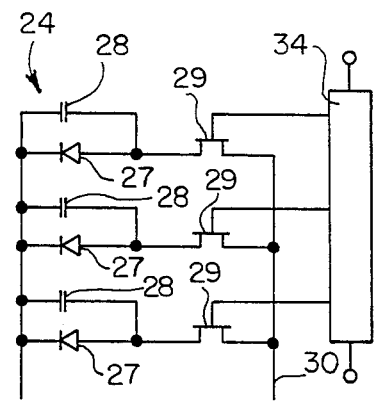
FIG. 4 is a schematic view of a portion of FIG. 3.

FIG. 4 shows a position of the diode array 24 circuitry which includes a plurality of light sensitive diodes 27 about 0.5 mil wide placed 2 mils apart over a total length of one inch. Each diode cell consists of a diode 27 and a parallel storage capacitor 28 and is connected through a solid state switch 29 to a common video buss 30. The charge from each capacitor 28 is dumped sequentially onto the video buss 30 through switches 29 under the control of a scanner 34 and is conveyed to a sample-and-hold circuit in a control unit as will be explained later. The electronics to derive the video charge and actuate switches 29 are contained within the diode array 24 and on the mounting printed circuit board 31. Suitable commercially available arrays are made by RETICON Corporation.

Figure 5:
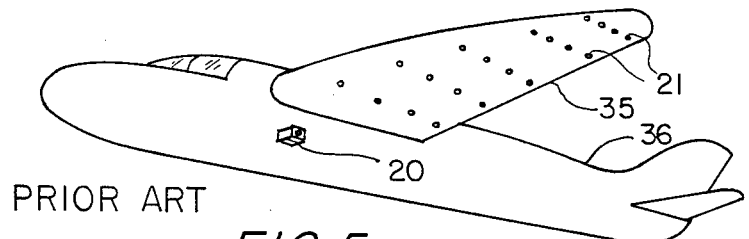
FIG. 5 illustrates use in aircraft testing.

In a particular application of wing motion detection indicated in FIG. 5, a plurality of light emitting diodes 21 are deployed on the underside of an aircraft wing 35. The aircraft fuselage 36 carries the electro-optic head 20. With this arrangement, the diodes 21 are sequentially energized and their corresponding positions are detected in a plane normal to the longitudinal axis of the aircraft. There may be some 200 emitters, each of which is to be scanned eight times in milliseconds each.

The emitter driver unit 40 (FIG. 6) provides the current drive for pulsing each emitter 21. Sequentially timed commands are received on line 41 to activate a Darlington Power transistor arrangement supplying the power to the emitter assembly. The duty cycle of each driver is the reciprocal of the number of emitters to be driven. The rise and fall time of the driver/emitter combination is about 1.5 and 11.5 microseconds, respectively. A power supply and one driver for each emitter are contained within the unit 40. The electronic control unit 50 which is substantially all of FIG. 6 except for the units 20, 21 and 40 provides all the controls, acquisition of data and processing which are required to operate the system.

System initiation is accomplished by an end-of-frame pulse derived from a Pulse Code Modifier (PCM) fed by the output of the control unit 50. This pulse is received at the start logic 51 which issues a start command to the diode array scan logic or driver 52 of the electro-optic head 20. A one megahertz clock 53 is also gated into the driver 52 and the scanning starts. The clock frequency applied to logic 51 determines the diode sample rate and is adjustable in the divider 54 from 300 KHz to 2 MHz.

Diodes in the array 24 are interrogated in sequence by connecting them through their internal MOS switches to the output video line 55. Each switch is closed for one negative half cycle of the clock period, discharging the diode capacitance onto an internal video buss capacitance at line 55. After reaching a steady state (in about 5 nanoseconds) the video line voltage is amplified in amplifier 56 and connected through output line 57 to a hold capacitor 58. The illumination of a diode 27 will discharge the capacitor in parallel therewith, e.g. 28 of FIG. 4 creating a definite peak 59 in the video output shown in the waveform in FIG. 7, as that diode is scanned. The position of the peak will identify the illuminated diode.

After the array 24 has been scanned, an end-of-scan pulse is produced at line 60 and is applied to blanking device 61 which produces and applies a video blanking command to a switch 62 to hold the video buss 63 at ground potential. The period of the blanking pulse is adjustable within the circuitry and determines the dwell time before the next scan. A period of 68 microseconds has been selected as appropriate.

Figures 6, 7, 8:
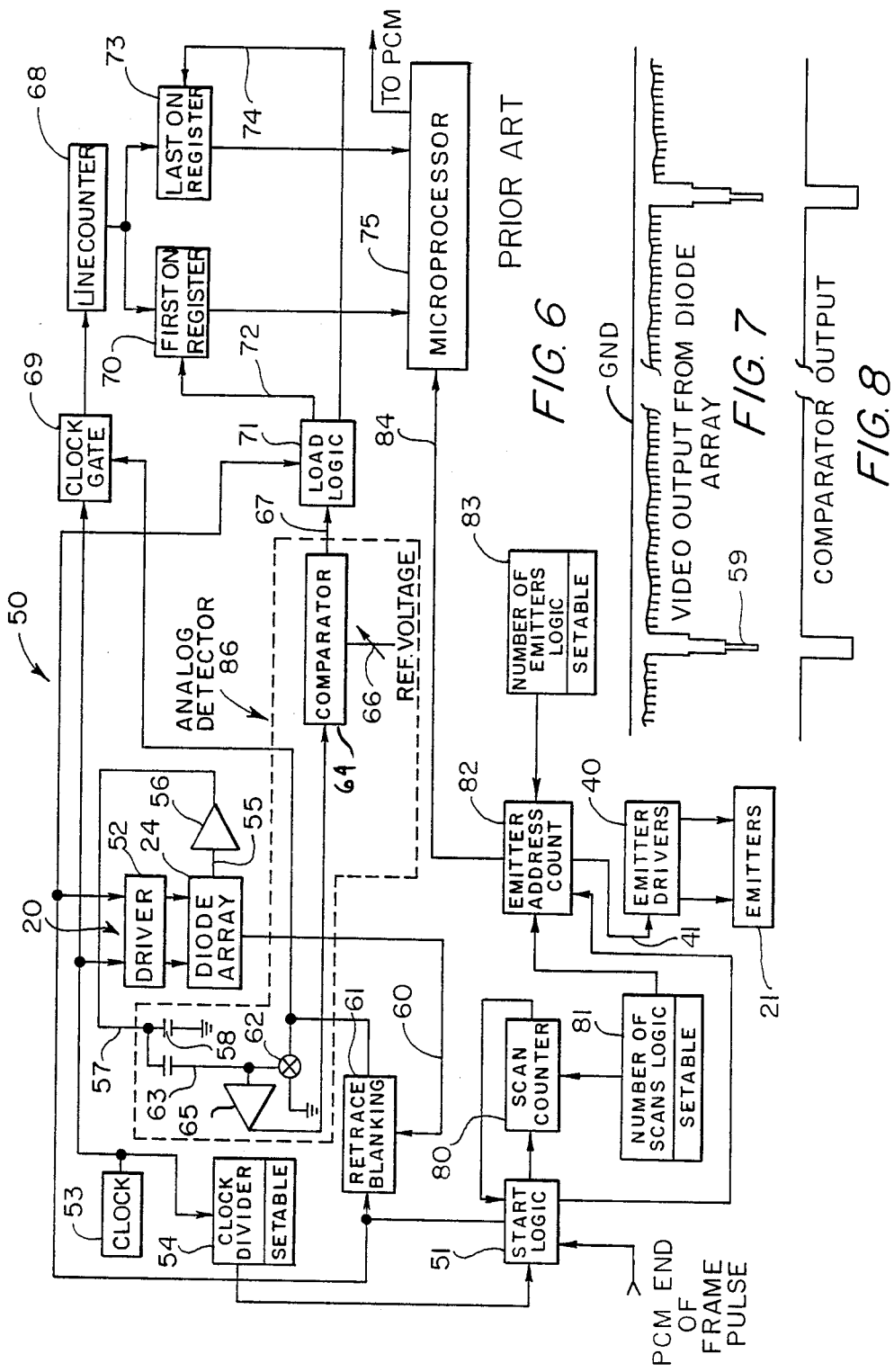
FIG. 6 illustrates a circuit diagram of a prior art system.
FIG. 7 illustrates a typical pulse train output from a prior art system.
FIG. 8 illustrates a typical comparator output from a prior art system.

The video buss data is applied to a voltage comparator 64 through amplifier 65. The comparator recognizes a pulse which exceeds in amplitude the amplitude of a reference signal 66 also applied to the comparator 64 and produces a step in the output signal at line 67 as shown in FIG. 8 whenever this occurs.

It will be understood that the illuminated line 23 (FIG. 3) at the diode array 24 may be wide enough to cause more than one diode 27 to be exposed. To overcome this situation, the "first" and "last" diode turned on must be identified. The width of the comparator output 67 represents the quantity of diodes turned on. The number of clock 53 pulses after the blanking pulse from device 61, i.e. from the beginning of a new scan, is determined in line counter 68 after transmission through the open gate 69. (The gate 69 is closed during the period of the blanking pulse). The count in counter 68 for the first-on diode is registered in register 70 at the leading edge of the comparator 64 output transmitted through the logic circuit 71 onto line 72 and similarly the last-on diode count is registered in register 73 at the trailing edge of the signal at line 67 transmitted through logic 71 onto line 74. At the end of each scan the counts in the first-on and last-on diode registers 70 and 73 are transferred to a microprocessor 75 where they are averaged to obtain the center diode number.

The completion of the first scan is identified to the start logic 51 and the scan counter 80 is advanced. The number of scans to be performed on one emitter source is determined by presetting the number of scans in logic 81. Emitter #N scanning continues until the scan counter 80 reaches the preset number and a pulse from logic 51 advances the emitter address counter 82 to select the next emitter (N+1) to be energized.

The system then waits for the next end-of-frame pulse to start logic 51 to initiate repetition of the operation. The emitter address counter 82 continues to count and recycles at the number of emitters selected in the number of emitters logic 83. A signal identifying which emitter is illuminated is passed to the microprocessor from the counter 82 through line 84.

In the apparatus just described, the motion of each emitter 21 is tracked along a line normal to the wing 35. The location of each emitter 21 on the wing structure 35 is known so that the one-dimension tracking is adequate.

The Present Improvement

The present invention is directed to replacing the circuitry in FIG. 6, generally indicated by reference numeral 86 and labeled ANALOG DETECTOR. The heart of the detector 86 to be replaced is comparator 64 which has been previously explained. In order to obtain the significant performance improvement which the present invention offers over the prior art, the analog detector 86 is replaced by a digital detector 86', which is shown in detailed block diagram form in FIG. 9.

FIG. 10D indicates three basic frame periods A, B and C of operation for the digital detector 86'.

Period A begins when a Start Command 1, as indicated by reference numeral 88 in FIG. 10A, occurs during which time the diode array 24 is scanned to cleanse the array of any residual charge from a previous acquisition frame. This cleansing of the residual charge is indicated by reference numeral 90 in FIG. 10C. During this time, none of the target emitters 21 is enabled. No data is acquired during this residual charge cleansing interval.

Figure 9:
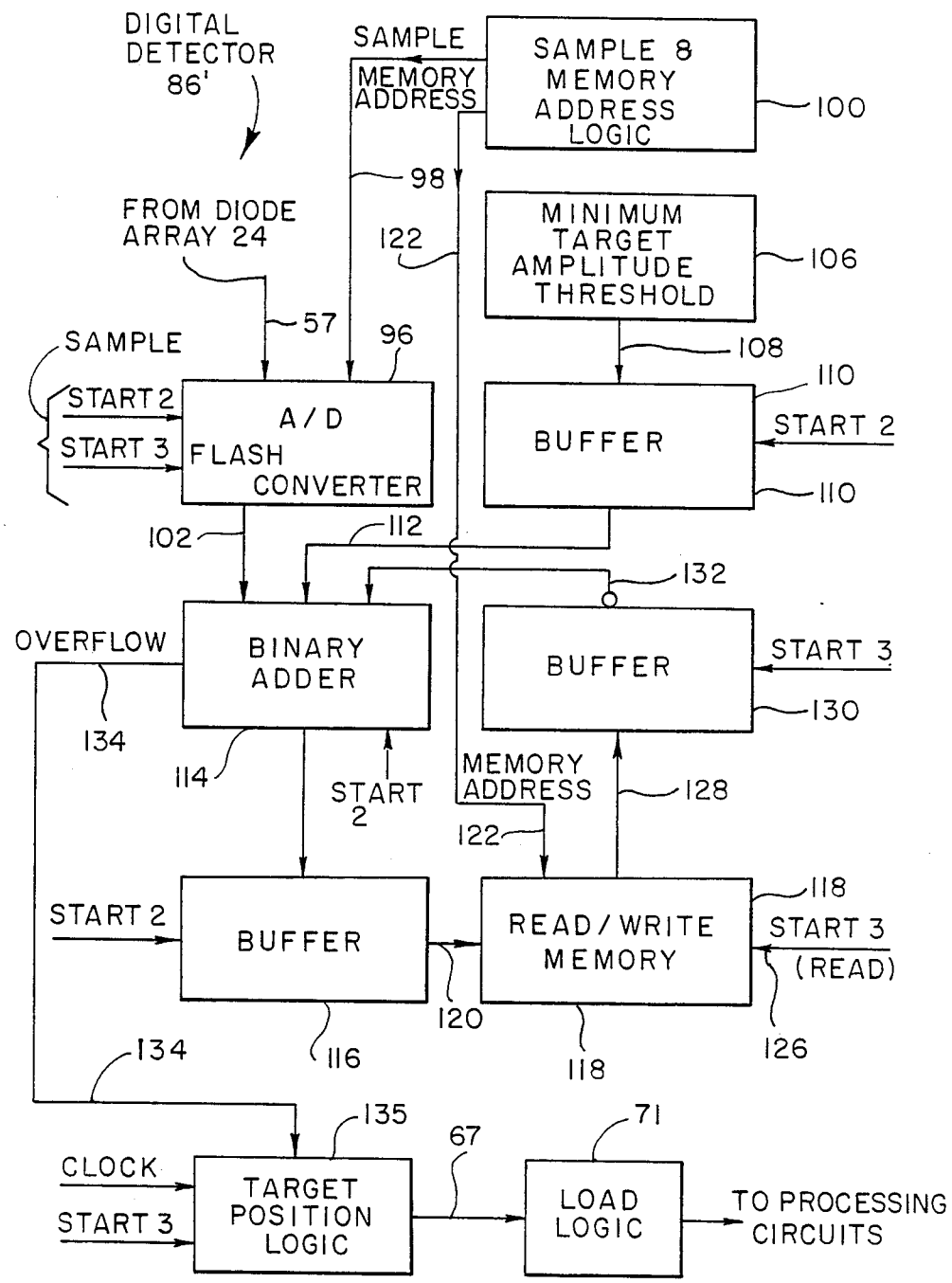
FIG. 9 is a block diagram of a digital detector used in the present invention, which replaces the comparator of the prior art system.

During frame period B the diode array 24 is exposed for a time interval, typically 1.5 ms to acquire background data while the target emitters 21 remain deactivated. After the exposure period a second array scan is made of the diode array 24. The scan period is initiated when a Start 2 Command is generated by start logic 51 (FIG. 6) and enables an A/D flash converter 96, as shown in FIG. 9. Such a converter is available from RCA and it converts analog signals representing individual outputs from the diode array to a digital format whose resolution is typically six bits.

The A/D converter 96 receives its data input along video buss line 57 (FIG. 6). Sampling synchronization of the conversions by converter 96 is governed by sample enable signals along line 98, generated from a conventional sample and memory address logic circuit 100. In order to assure a reasonable signal-to-noise ratio, a minimum target amplitude threshold signal is imposed on the digital signals of the system which occurs by introducing a constant digital value from generator 106 to buffer 110 - via line 108. When buffer 110 receives an enable signal, namely, a Start 2 Command, the minimum threshold constant value is outputted from buffer 110 to a binary adder 114 via line 112 where the constant threshold value is added with the output from A/D converter 96 (introduced via line 102). The resultant from adder 114 is loaded into a read/write memory 118 via intermediate buffer 116 and connecting line 120. The resultant value from each scanned diode of array 24 is loaded into a separate memory location in memory 118. The indexing of memory 118 is governed by memory addressing signals along line 122 which are generated by a sample and memory address logic circuit 100 of conventional design.

The loading of diode array data occurs in memory 118 in sequential order until all diodes have been sampled. Thus, at the end of period B, data has been collected from the entire diode array but only for the effect of background on the diode array since the target emitters 21 have thus far not been energized. The quantized signal of background data output from the diode array appears at reference numeral 104 in FIG. 10C.

At the next moment of time period C is initiated. The target emitters 21 are enabled and the array 24 is exposed for another exposure interval at the beginning of period C, as seen in FIGS. 10C and 10D. During this period a third scan command is generated by start logic 51 (FIG. 6), the Start 3 Command signal being evidenced at 105 in FIG. 10A. Data from the target emitters immediately begins to develop; and when particular emitter targets are detected by corresponding diodes of the array, a target signal is digitized by A/D flash converter 96 and a composite, signal of background and target data are generated at the video buss output line 102 of A/D converter 96, which is indicated in FIG. 9 as receiving an enable signal during the Start 3 Command. At the initiation of the third scan the Start 3

Command commences a READ cycle of memory 118, which recovers data words previously stored during frame period B. This would include data relating to the composite of background and the constant minimum target amplitude threshold previously introduced by circuit 106.

The memory data word of each diode is sequentially released via line 128 to buffer 130 where it is complemented to form a one's complement of the background plus threshold amplitude value. The output 132 from buffer 130 is converted into a two's complement (negative) value in binary adder 114 and subtracted from the background plus target data in a two's complement binary addition. The two's complement arithmetic will generate an overflow from the sign bit (most significant bit in a two's complement number system) if the result of the subtraction is positive. Positive results indicate the target data amplitude 109 (FIG. 10C) is equal to or exceeds the threshold level 136 (FIG. 10C) which is the maximum level resulting from a superposition of background 104 and offset 107 occurring during period B.

When a positive result occurs it is manifested by an overflow signal on binary adder output line 134. The overflow output represents the width of the target image and its location from an array zero reference point as measured at the threshold level. Further processing of these bits via a target position logic circuit occurs when this circuit is enabled by a clock pulse and a Start 3 Command. The output along line 67 of target position logic circuit 135 (gating means) outputs a signal equivalent to the comparator output of analog detector 86 (FIG. 6) of the prior system. Further processing by load logic circuit 71 and the remaining output circuits including microprocessor 75 is done in the same manner as in the prior system of the mentioned U.S. patent.

It should be understood that the invention is not limited to the exact details of construction shown and described herein, for obvious modifications will occur to persons skilled in the art.

We claim:

1. An apparatus for analyzing aircraft wing movement under load, the apparatus comprising:
   a plurality of light sources located on an aircraft wing which moves relative to a fuselage;
   a diode array mounted on the aircraft fuselage for sensing light from the sources as well as background, and converting sensed light to analog signals corresponding to wing displacement;
   analog/digital converting means connected to the diode array output for converting the analog signals to corresponding digital signals after elimination of residual charge in the diode array;
   means for storing the digital signals derived from background light alone;
   means connected to the output of the storing means for subtracting the digital signals during the two time periods -
   (a) non-energization of the light sources when only background light is present,
   (b) energization of the light sources when the background light is also present;
   whereby the effects of background light are eliminated thereby correlating an output from the diode array solely to the light sources on the wing;
   an overflow output of the subtracting means for carrying data representing the location of a sensed light source exceeding a threshold and located relative to a reference point; and
   means having an input connected to the overflow output for gating overflow data with a system clock, the latter clock providing system timing for the light sources and the light-sensing array.

2. A method for analyzing aircraft wing movement under load comprising the steps:
   sensing background light over an array of diode elements mounted in a co-planar manner on an aircraft fuselage and converting the light to analog signals corresponding to wing displacement;
   eliminating residual charge on the diode elements;
   converting the analog signals to corresponding digital signals;
   storing the digital signals derived from sensed background light alone;
   sequentially energizing a plurality of light sources located on a wing of the aircraft;
   subtracting the corresponding digital signals during the two time periods -
   (a) non-energization of the light sources when only background light is present,
   (b) energization of the light sources when the background light is also present;
   whereby the effects of background light are eliminated thereby correlating an output from the diode elements solely to the sources on the wing;
   generating an overflow from the subtraction when the subtraction yields a value greater than a threshold value, the overflow representing a location of an energized light source relative to a reference point; and
   gating the overflow data with a system clock, the latter providing system timing for the light sources and the light-sensing array.

* * * * *

UNITED STATES PATENT AND TRADEMARK OFFICE
CERTIFICATE OF CORRECTION

PATENT NO. : 4,840,069

DATED : June 20, 1989

INVENTOR(S) : Herbert R. Hampton, et al.

It is certified that error appears in the above-identified patent and that said Letters Patent is hereby corrected as shown below:

Column 1, line 7, delete "now abandoned".

Column 6, line 64, delete ",".

Signed and Sealed this

Twenty-fourth Day of April, 1990

*Attest:*

HARRY F. MANBECK, JR.

*Attesting Officer*    *Commissioner of Patents and Trademarks*